Patented Sept. 1, 1931

1,821,195

UNITED STATES PATENT OFFICE

JOHN C. WOODHOUSE, OF WILMINGTON, DELAWARE, ASSIGNOR TO DU PONT AMMONIA CORPORATION, OF WILMINGTON, DELAWARE, A CORPORATION OF DELAWARE

GAS PURIFICATION

No Drawing.   Application filed June 17, 1930. Serial No. 461,856.

This invention relates to the removal of carbon dioxide from gases at elevated temperatures and more particularly to the separation of carbon dioxide from hydrogen or gaseous mixtures containing hydrogen.

In removing carbon dioxide from gaseous mixtures containing the same it is sometimes desirable to effect the separation at an elevated temperature. Thus, for example, in the production of hydrogen by catalytic reaction of a gaseous mixture of steam and a carbon-containing compound, such as carbon monoxide or a hydrocarbon, e. g. methane, it is known that a more efficient conversion of the carbon-containing material, and a correspondingly purer hydrogen, can be obtained if the gaseous products of the catalysis, including carbon dioxide, are subjected in a heated condition to carbon dioxide removal and then to further catalysis. That is, by removing carbon dioxide from the reaction system and thereby displacing the established equilibrium, a further conversion of the raw materials to hydrogen is made possible.

Magnesium oxide has been proposed as a carbon dioxide absorbent for use in processes of the character referred to. My experiments have shown, however, that this substance as ordinarily prepared is not well adapted for the purpose, for, while it will absorb carbon dioxide at a reasonably rapid rate up to about 150° C., the absorptive rate decreases rapidly as the temperature is raised and ultimately becomes negligibly small at more elevated temperatures. For example, I have found in the case of magnesium oxide prepared by the calcination of mineral carbonates that the rate of carbon dioxide absorption rapidly falls as the temperature is raised above 150° C., and in fact even at 200° C. the rate is insignificant. Also, magnesium oxide obtained by highly heating magnesium hydroxide is relatively unsatisfactory in the same respect, showing a practically negligible absorption at temperatures as low as 170–210° C., depending upon the source of the material. It should be observed that the falling off in absorption rate for these materials occurs after a period of initial absorption at a satisfactory rate. This preliminary absorption, varying in amount with the method of preparing the material, corresponds to a conversion of, say, 2.5% of the magnesium oxide to carbonate.

I have discovered that very satisfactory results can be obtained in the separation of carbon dioxide from gaseous mixtures, for example, mixtures containing hydrogen, nitrogen, methane, and other hydrocarbons, or the like, particularly at the higher temperatures by employing as the absorbing agent magnesium oxide prepared by calcination of artificially precipitated magnesium carbonate. I have no explanation to suggest for the peculiar behavior of this material, but for the purposes of the present invention it is clearly fundamentally different from ordinary magnesium oxide, such as is obtained, for example, by calcination of either a naturally occurring carbonate or the hydroxide of magnesium. For instance, at elevated temperatures, e. g. 150–350° C., I have found the improved form of magnesium oxide will, after the above referred to initial period of absorption, take up carbon dioxide at a rate approximately ten times as great as that of magnesium oxide from mineral carbonate under the same conditions. Furthermore, while the improved magnesium oxide, like other forms, shows an eventual decrease in absorption rate when the temperature is sufficiently elevated, even at temperatures as high as 350° C. it will take up carbon dioxide at a very substantial rate.

It will be understood that the foregoing statements of absorption rates are based on behavior of the material at ordinary pressure. Increased pressure enhances the speed of absorption. Thus I have prepared magnesium oxide from the precipitated carbonate which attained at various temperatures and pressures (other conditions constant) the degrees of conversion to magnesium carbonate noted below before showing any decrease in absorptive rate. The gaseous mixture used contained 20% by volume of $CO_2$ and 80% $H_2$.

| Temp. °C. | Pressure Ats. | Conversion MgO to $MgCO_3$ per cent |
|---|---|---|
| 150 | 10 | 52 |
| 150 | 28 | 62 |
| 305 | 10 | 40 |
| 310 | 28 | 60 |

Various methods may be employed for preparing the magnesium oxide to be used in accordance with the present invention, the desirable properties which I have observed being characteristic of magnesium oxide obtained from artificially precipitated magnesium carbonate generally. Thus, for example, any of the methods described by Mellor, "A comprehensive treatise on inorganic and theoretical chemistry", v. 4, pp. 349–367, and involving the reaction of a solution of a magnesium salt and a suitable carbon dioxide-containing compound, may be used. The particular details of preparation of the magnesium carbonate are of less importance than that the material shall have the physical characteristics resulting from synthetic preparation. Thus, for example, advantage lies with those methods producing a carbonate in finely divided form and, in general, in avoiding high temperatures.

A further feature of the present invention is the discovery, not only that the presence of steam in the gaseous mixture favors the removal of carbon dioxide therefrom but also that the proportions of steam present have a critical effect upon the results. Specifically my researches have demonstrated that the most satisfactory absorption is obtained when the volume ratio of steam to other constituents in the gaseous mixture being treated is approximately 0.5. As the steam concentration is raised above or lowered below this value a lower rate of absorption is observed, although the unfavorable effect is somewhat more marked with the lower ratios. The variation is not very large, however, as long as the ratio mentioned is maintained within the range of substantially 0.2 to 1.7 and it is with steam concentrations of this order, therefore, that it is preferred to operate. It should, moreover, be noted that the favorable influence of the steam concentrations referred to applies not only to the specific form of magnesium oxide which has previously been described but also to magnesium oxide generally.

The following examples will serve to indicate the preferred procedure in carrying out the invention, it being understood that the invention is susceptible of wide variation in the manner of operation and is not limited to the specific details and methods of procedure herein described.

*Example 1.*—Add 234 volumes of a 10% solution of magnesium sulfate to 208 volumes of a 5% solution of sodium carbonate. After allowing the precipitate to settle, decant the supernatant liquid, wash the precipitate thoroughly with boiling water and dry it at a little above 100° C. The dried material is crushed and formed into tablets of 4–8 mesh size by compression in a tableting machine such as is employed for the preparation of pharmaceutical tablets. The product is then charged into a reaction vessel, capable of withstanding pressure, of any suitable size and shape, and is activated by heating to about 450° C. until carbon dioxide is no longer evolved. The decomposition of the carbonate is facilitated by passing a stream of an inert gas, such as nitrogen, methane, etc., through the apparatus during the heating. Magnesium oxide prepared in the foregoing manner has been employed in the purification of a gaseous mixture containing 80 per cent. by volume of hydrogen and 20 per cent. by volume of carbon dioxide, sufficient steam being added to correspond to a volume ratio of steam to hydrogen plus carbon dioxide of 0.5. Using a temperature of 305° C., a pressure of 10 atmospheres and a carbon dioxide space velocity of about ten to forty, the carbon dioxide was reduced to 0.1 per cent. and continued to be absorbed at a rapid rate until the magnesium oxide had taken up 45 per cent. of its calculated capacity for carbon dioxide. By way of comparison, I have observed that under the same conditions magnesium oxide prepared by calcination of mineral carbonate will absorb carbon dixide at a satisfactory rate only up to about 5% of its calculated capacity.

*Example 2.*—Magnesium oxide prepared in the manner indicated in Example 1 can be employed in the preparation of hydrogen of a high degree of purity from methane or similar hydrocarbons. A hot gaseous mixture containing 18.4 volumes carbon dioxide, 78.4 volumes hydrogen, and 3.2 volumes carbon monoxide and methane, obtained by passage of a mixture of steam and methane at 550° C. over a nickel-alumina catalyst, such as is described in the copending application of Roger Williams, Serial No. 118,600, is passed over the body of pelleted magnesium oxide at 310° C. and a pressure of 28 atmospheres together with sufficient steam to correspond to a ratio of steam to other gas of 0.5. After removal of the carbon dioxide in this manner, the gaseous mixture is submitted again to a body of methane-steam converting catalyst to transform further of the methane to hydrogen. By thus alternately converting and absorbing, a substantially complete conversion of methane to hydrogen can be obtained.

It will be understood that the invention relates to removal of carbon dioxide from gaseous mixtures broadly and that therefore wide variations may be made in its application to the purification of gaseous mixtures obtained in the production of hydrogen from steam and carbon compounds. Thus, for example, it is known that the stepwise production of hydrogen from carbon monoxide, or hydrocarbons, and steam—i. e. alternate catalytic conversion and high temperature absorption of carbon dioxide—can be modified to the extent of effecting the transformation in what amounts to an infinite rather than a limited number of stages. This is accomplished by disposing the steam conversion catalyst in intimate association with the carbon dioxide absorbent, for example, by mixing catalyst granules with absorbent granules or actually impregnating the absorbent with catalyst or precipitating the catalyst upon the absorbent. The absorbent thus becomes an acceptor for the carbon dioxide, in that it removes the latter from the reaction system as fast as it is formed. Since in ultimate effect, if not in manner of operation, this method is the same as that involving conversion and absorption in stages, it will be recognized that the general principles hereinbefore set forth are applicable to this type of process and the following claims are to be taken, therefore, as including the use of magnesium oxide either as a true absorbent or as an acceptor.

Various changes may be made in the method described without departing from the invention or sacrificing any of the advantages thereof.

I claim:

1. The process of removing carbon dioxide from a gaseous mixture containing the same which comprises contacting said gaseous mixture at an elevated temperature with magnesium oxide prepared by calcination of artificially precipitated magnesium carbonate.

2. The process of removing carbon dioxide from a gaseous mixture containing carbon dioxide and hydrogen which comprises contacting said gaseous mixture at an elevated temperature with magnesium oxide prepared by calcination of artificially precipitated magnesium carbonate.

3. The process of removing carbon dioxide from a gaseous mixture containing the same which comprises contacting said gaseous mixture, together with steam, at an elevated temperature with magnesium oxide prepared by calcination of artificially precipitated magnesium carbonate.

4. The process of removing carbon dioxide from a gaseous mixture containing carbon dioxide and hydrogen which comprises contacting said gaseous mixture, together with steam, at an elevated temperature with magnesium oxide prepared by calcination of artificially precipitated magnesium carbonate.

5. The process of removing carbon dioxide from a gaseous mixture containing carbon dioxide and hydrogen which comprises contacting said gaseous mixture, together with steam corresponding to a volume ratio of steam to other gases within the range of from 0.2 to 1.7 at an elevated temperature with magnesium oxide prepared by calcination of artificially precipitated magnesium carbonate.

6. The process of removing carbon dioxide from a gaseous mixture containing carbon dioxide and hydrogen which comprises contacting said gaseous mixture, together with steam corresponding to a volume ratio of steam to other gases of substantially 0.5 at an elevated temperature with magnesium oxide prepared by calcination of artificially precipitated magnesium carbonate.

7. The process of removing carbon dioxide from a gaseous mixture containing carbon dioxide and hydrogen which comprises contacting said gaseous mixture, together with steam corresponding to a volume ratio of steam to other gases within the range of from 0.2 to 1.7, and at an elevated temperature with magnesium oxide.

8. The process of removing carbon dioxide from a gaseous mixture containing carbon dioxide and hydrogen which comprises contacting said gaseous mixture, together with steam corresponding to a volume ratio of steam to other gases of substantially 0.5, and at an elevated temperature with magnesium oxide.

9. The process of removing carbon dioxide from a gaseous mixture containing carbon dioxide and hydrogen which comprises contacting said gaseous mixture at a temperature within the range of 150–350° C. with magnesium oxide prepared by calcination of artificially precipitated magnesium carbonate.

In testimony whereof, I affix my signature.

JOHN C. WOODHOUSE.